Nov. 29, 1960 W. V. PRIEST 2,961,980
MACHINE FOR PREPARING SOIL FOR PLANTING
Filed Feb. 11, 1959
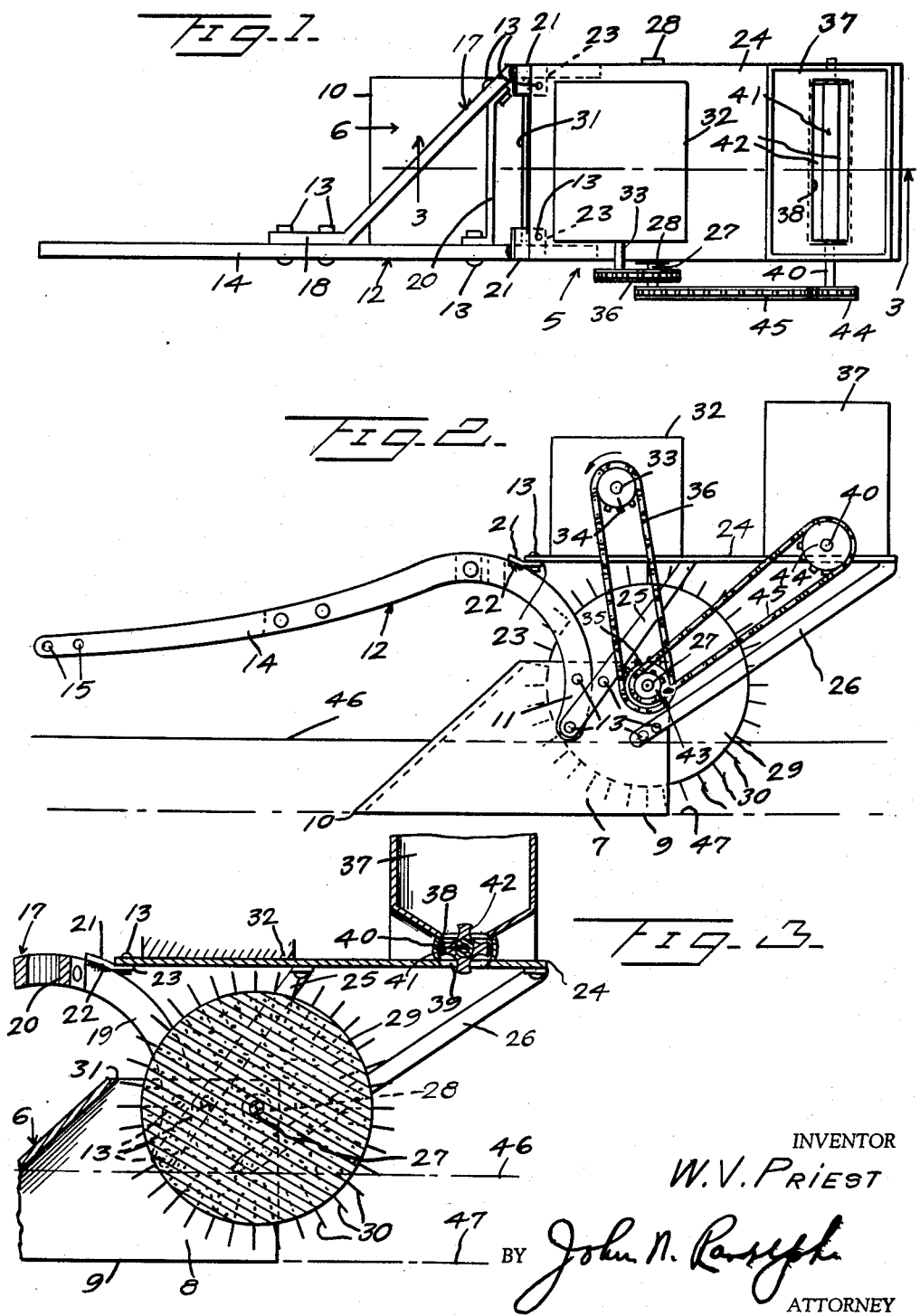
INVENTOR
W. V. PRIEST
BY John N. Randolph
ATTORNEY

2,961,980
MACHINE FOR PREPARING SOIL FOR PLANTING

Wesley V. Priest, R.R., Basehor, Kans.

Filed Feb. 11, 1959, Ser. No. 792,539

3 Claims. (Cl. 111—10)

This invention relates to a machine of extremely simple construction, adapted to be drawn behind a conventional draft vehicle, such as a tractor, for accomplishing in a single operation the three operations of plowing, discing and fertilizing, which are normally accomplished separately, preparatory to planting.

Another object of the present invention is to provide a machine by means of which only a narrow strip of ground, in which the crop row is to be planted, will be prepared for planting by the machine, each time that it traverses a field, so that portions of the earth between the crop rows can be left uncultivated.

A further object of the invention is to provide a machine which is especially adapted for use in cultivating and fertilizing soils having a high clay content.

Still a further object of the invention is to provide a machine wherein a correct amount of fertilizer will be deposited upon the soil after it has been properly cultivated for planting and so that maximum benefit will be obtained from the fertilizer.

Various other objects and advantages of the invention will hereinafter become more fully apparent from the following description of the drawing, illustrating a presently preferred embodiment thereof, and wherein:

Figure 1 is a top plan view of the machine;

Figure 2 is a side elevational view thereof, and

Figure 3 is a fragmentary longitudinal sectional view, on a slightly enlarged scale, taken substantially along a plane as indicated by the line 3—3 of Figure 1.

Referring more specifically to the drawing, the machine in its entirety and comprising the invention is designated generally 5 and includes a downwardly and forwardly inclined blade 6 of substantial and uniform width having corresponding side walls 7 and 8 extending rearwardly from side edges thereof. The walls 7 and 8 are preferably formed integral with the blade 6 and extend from top to bottom thereof and have bottom edges 9 disposed coplanar with the bottom edge 10 of the blade 6.

A downwardly curved rear end 11 of a draft beam 12 is secured by fastenings 13 to the outer side of the wall 7. The rear beam end 11 extends from the upper edge of the wall 7 and is forwardly curved. The beam 12 includes a relatively long forwardly extending portion 14 which is downwardly inclined from the upper end of the rear portion 11 and which has a forward end provided with spaced openings 15 for attachment to a draft connection, not shown, of a draft vehicle, not shown, and so that the beam 12 will be held against vertical swinging movement relative to the draft vehicle.

A diagonal brace 17 extends diagonally across and is disposed above the blade 6, as seen in Figure 1, and has a forward end 18 which is secured by additional fastenings 13 to the beam portion 14, substantially midway of the ends thereof. The brace 17 has a downwardly curved opposite rear end 19 which substantially corresponds to the rear brace end 11 and is secured to the outer side of the wall 8 by additional fastenings 13. A cross brace 20 extends transversely between a part of the beam 12 and the brace 17 and has end portions secured by other fasenings 13 to the beam and brace, as best seen in Figure 1, and is disposed substantially behind the forward end 18 of the brace 17. Angular bracket members are secured to the upper edges of the portions 11 and 19 behind and adjacent the cross brace 20. Each of said brackets includes a front portion 21 which is secured by welding, as seen at 22 to the part 11 or 19. Each bracket has a horizontally disposed rear half 23, which is disposed at an obtuse angle to the front half 21. The front corners of a rigid plate 24 rests upon and are secured by additional fastenings 13 to the rear bracket portions 23, for supporting the plate or platform 24 substantially above the blade 6 and walls 7 and 8. The plate or platform 24 is preferably of a width at least equal to the spacing between the walls 7 and 8 and is of a length to extend rearwardly substantially beyond the rear ends of said walls. Braces 25 and 26 are secured by additional fastenings 13 to the outer sides of both walls 7 and 8 and extend upwardly and rearwardly at an incline therefrom and have upper ends disposed beneath and suitably secured to the plate 24, midway of the ends and adjacent the rear end thereof, respectively.

A shaft 27 extends through and is journaled in bearings 28. Bearings 28 are mounted in the upper rear corners of the walls 7 and 8. A roller 29, preferably formed of concrete, is fixed to the shaft 27, between the walls 7 and 8, and is of a length to extend to adjacent said walls but is mounted for free rotation therebetween. A multiplicity of spikes or tines 30 are anchored in and project outwardly a short distance from the periphery of the roller 29 and are disposed in spaced apart relation to one another both longitudinally and circumferentially of said roller. The outer extremities of the spikes 30 are spaced approximately uniform distances from the periphery of the roller 29, and said roller is so mounted by the shaft 27 that the bottommost spikes are disposed slightly above the level of the bottom edges 9 of the walls 7 and 8 and the uppermost spikes are disposed beneath and spaced slightly from the part of the platform 24 disposed directly thereabove. Forwardmost ones of the spikes 30 are disposed behind and have slight clearance relative to the upper rear edge 31 of the blade 6, as best seen in Figure 3.

A motor 32 of any conventional type, preferably a gasoline engine, is mounted on and secured to the forward portion of the platform 24 and has a rotary driven shaft 33 projecting outwardly therefrom beyond the side edge of the platform 24 which is disposed over the wall 7. A sprocket wheel 34 is fixed to the motor shaft 33 and is connected to a sprocket wheel 35, which is secured to the shaft 27, outwardly of the wall 7, by an endless chain 36.

An open top fertilizer hopper 37 is mounted on and secured to the rear portion of the platform 24 and is provided with an outlet opening 38 in the bottom thereof. The platform 24 has a transversely extending opening 39 which is disposed directly beneath and is coextensive with the hopper outlet 38. A shaft 40 extends lengthwise of the hopper 37 and crosswise of the platform 24 and is journaled in end portions of the hopper 37. A rotary valve 41 is fixed to the shaft 40 and is supported thereby for rotation in the outlet openings 38 and 39 and is provided with pockets 42 for receiving fertilizer, not shown, as said pockets rotate through the opening 38, and for discharging the fertilizer through the opening 39, as said pockets rotate through said opening 39. The size of the pockets 42 can be varied to vary the amount of fertilizer dispensed. A small sprocket wheel 43 is fixed to the shaft 27, outwardly with respect to the sprocket wheel 35, and a larger sprocket wheel 44 is fixed to an end of the shaft 40 and is disposed in the same vertical plane as the sprocket wheel 43. An endless chain 45 is trained over the sprocket wheels 43 and 44 for driving the shaft 40 and valve 41 from the shaft 27. The relative size of the sprocket wheels 43 and 44 may also be varied for varying the rate of discharge of the fertilizer from the hopper 37.

The forward end of the beam 12 is positioned at a desired elevation and coupled to the draft vehicle, not shown, to cause the blade 6 to penetrate the earth to a desired depth. For example, if the beam 12 is located at the elevation as seen in Figure 2, above the ground level 46, the forward edge 10 of the blade 6 will penetrate the earth to the depth as indicated in Figure 2 and the lower portions of the walls 7 and 8 will travel in the ditch 47 cut by the blade 6. The shaft 33 turns counterclockwise, as seen in Figure 2, for revolving the roller 29 in the same direction and so that the forward half of said roller is traveling downwardly. The earth through which the blade 6 moves is deflected upwardly by said blade over the upper blade edge 31 and into the downwardly traveling tines 30 by which the plowed earth is broken up and pulverized. The roller 29 is revolved at a speed several times the speed at which it would revolve if in rolling engagement with the ground. Thus, the pulverized earth is thrown upwardly and rearwardly from beneath the bottom of the roller 29, by the upwardly and rearwardly traveling tines 30, after further pulverizing of the earth has been accomplished as the earth passes under the roller, between the bottommost part thereof and the portion of the bed of the ditch 47 disposed directly therebeneath. During this operation, fertilizer is discharged onto the surface of the loosened and pulverized earth or soil which is discharged back into and refills the ditch 47 directly behind the roller 29, so that the cultivated soil can be readily impregnated with the fertilizer and will be ready for planting immediately after the fertilizer has been deposited thereon. It will also be apparent that the machine 5 can be utilized in the aforedescribed manner to cultivate and fertilize spaced parallel strips of a field in which crop rows are to be planted, leaving the earth between the crop rows undisturbed and so that only the parts of the field in which the crop rows are to be planted will be cultivated and fertilized. In this manner, a considerable saving in time and in the amount of fertilizer used will be realized.

Various modifications and changes are contemplated and may be resorted to, without departing from the function or scope of the invention as hereinafter defined by the appended claims.

I claim as my invention:

1. A machine for preparing soil for planting comprising an upwardly and rearwardly inclined plow blade having upwardly and rearwardly inclined side edges, side walls connected to and extending rearwardly from the side edges of the blade and disposed substantially parallel to one another, means connected to said walls for propelling the blade forwardly and for maintaining the blade at a level to cause the lower part of the blade to be embedded in the earth for digging a trench and for deflecting the earth therefrom upwardly and over the upper rear end of the blade, an earth pulverizing roller, means rotatably supporting said roller between said side walls and behind said blade, a support mounted on said first mentioned means and disposed above and behind said roller, a power source mounted on said support, a fertilizer hopper mounted on said support, rearwardly of said roller, including a rotary driven dispensing valve, and means forming a driving connection from said power source to the roller and dispensing valve for revolving the roller and dispensing valve simultaneously, said roller being driven by said last mentioned means in a direction whereby the forward half of the roller travels downwardly for receiving the plowed earth discharged from the upper end of the blade and for pulverizing and returning the earth to the ditch, formed by the blade, behind said roller, said roller having an upper portion extending to substantially above the level of the upper rear end of said blade and a lower portion disposed only slightly above the level of the bottom edge of the blade and the bottom edges of the side walls and adapted to extend into the ditch.

2. A machine for preparing soil for planting as in claim 1, said roller having a solid periphery and being provided with a multiplicity of spaced spikes projecting outwardly from said periphery, said roller being revolved at a speed in excess of the translational speed of movement of the machine and having a portion disposed in close proximity to the upper end of the blade whereby the earth from the blade is initially returned to the ditch between the blade and roller and the side walls and is thereafter thrown rearwardly in passing under the roller.

3. A machine for preparing soil for planting comprising a relatively wide upwardly and rearwardly inclined blade, side walls connected to and extending rearwardly from side edges of the blade and disposed substantially parallel to one another, said side walls having bottom edges disposed substantially coplanar with a bottom leading edge of said blade, means connected to said side walls for propelling the blade forwardly and for maintaining the blade and side walls at a level to cause the lower part of the blade and the lower portions of the side walls to be embedded in the earth with said blade functioning for digging a trench and for deflecting the earth therefrom upwardly and over an upper rear end of the blade, an earth pulverizing roller, means rotatably supporting said roller between said side walls behind and adjacent the blade and with the lower portion of the roller disposed above and adjacent the level of the bottom edges of the blade and side walls and an upper portion of the roller disposed substantially above the level of the upper rear end of the blade, a support mounted on said first mentioned means and disposed above the roller, a power source mounted on said support, and means forming a driving connection from said power source to the roller for revolving the roller in a direction whereby the forward half of the roller travels downwardly for directing the plowed earth discharged from the upper end of the blade into the ditch between the side walls, behind the blade and in front of the roller and for thereafter throwing the earth rearwardly in the ditch as the roller passes over the earth.

References Cited in the file of this patent

UNITED STATES PATENTS

| | | |
|---|---|---|
| 91,867 | Reister | June 29, 1869 |
| 971,990 | Grantham | Oct. 4, 1910 |
| 1,395,370 | Tate | Nov. 1, 1921 |
| 1,485,819 | Shields | Mar. 4, 1924 |
| 1,655,457 | Dierickx | Jan. 10, 1928 |

FOREIGN PATENTS

| | | |
|---|---|---|
| 370,886 | Germany | July 13, 1921 |
| 723,105 | Great Britain | Feb. 2, 1955 |
| 30,699 | Norway | May 3, 1920 |